United States Patent Office 3,560,516
Patented Feb. 2, 1971

3,560,516
OXAZOLE DERIVATIVES
Ryonosuke Yoshida, Kamakura-shi, Kanagawa-ken, Itsutoshi Maeda, Tokyo, Kazushi Togo, Kawasaki-shi, Kanagawa-ken, Soichiro Asai, Tokyo, and Masahiro Takehara, Kawasaki-shi, Kanagawa-ken, Japan, assignors to Ajinomoto Co., Inc., Tokyo, Japan
No Drawing. Filed Aug. 1, 1967, Ser. No. 657,517
Claims priority, application Japan, Aug. 8, 1966, 41/52,012, 41/52,013, 41/52,014; Oct. 3, 1966, 41/65,041; Jan. 10, 1967, 42/1,893; May 15, 1967, 42/30,724
Int. Cl. C07d 85/00
U.S. Cl. 260—307                            4 Claims

ABSTRACT OF THE DISCLOSURE

Pyridine derivatives which are known precursors of vitamin $B_6$ are prepared from oxazole derivatives of the formula

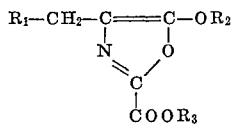

wherein $R_1$ is hydrogen, carboxy, or carbo-lower alkoxy, $R_2$ is lower alkyl, and $R_3$ is hydrogen or lower alkyl by partial decarboxylation and further reactions in a known manner, or by Diels-Alder reaction with suitable dienophiles. The oxazole derivatives are prepared by reacting a dialkyl oxalate with an ester of alanine or aspartic acid to the corresponding N-alkoxalyl amino acid ester, and closing the oxazole ring by means of a dehydrating agent and an organic base.

---

This invention relates to novel oxazole derivatives which are intermediates for the synthesis of vitamin $B_6$.

The production of vitamin $B_6$ from an oxazole derivative has been described in U.S. Patent No. 3,227,721. According to this known method, an oxazole derivative is synthesized by the reaction of ethyl N-formyl-α-alaninate with phosphorus pentoxide. Since the reaction mixture forms a hard mass in the reaction vessel, the product, 4-methyl-5-lower-alkoxyoxazole, must be extracted by a solvent under cooling after crushing of the hard mass; and the industrial operation of the method is, therefore, difficult.

An improvement of this known method has been proposed (Netherlands patent application No. 6508673), but the proposed method requires a large amount of ether solution of expensive boron trifluoride, and of necessity has numerous steps.

It has not been found that 4-methyl-5-lower-alkoxy-2-oxazolecarboxylic acid, 4-lower-carboalkoxymethyl-5-lower-alkoxy-2-oxazolecarboxylic acid and their lower alkyl esters are useful intermediates for the synthesis of vitamin $B_6$, because these compounds can be produced at low cost by a simple method and the conversion of the compounds to vitamin $B_6$ is also easy.

The present invention is illustrated by the following diagram, wherein $R_2$ and $R_3$ are lower alkyl $R_1$ is a hydrogen or —$COOR_2$, and $R'_1$ is hydrogen or carboxyl.

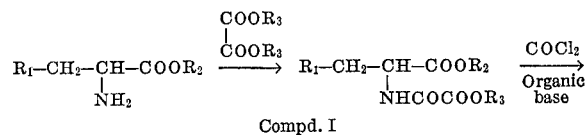

Compd. I

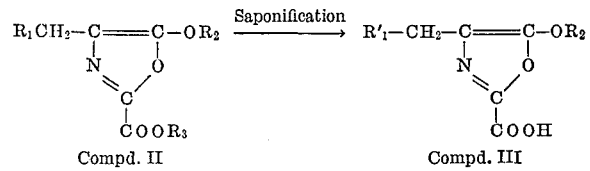

Compd. II              Compd. III

PREPARATION OF COMPD. I

Although Compd. I (a lower alkyl ester of lower alkoxalyl-alanine or of lower alkoxalyl-aspartic acid) can be produced according to the known method wherein a lower alkyl ester of alanine hydrochloride is reacted with ethoxalylchloride [Chem. Ber., 30, 579–585 (1887)], the following novel method is particularly advantageous.

A lower alkyl ester of alanine or a lower alkyl diester of aspartic acid is reacted with a lower alkyl diester of oxalic acid at elevated temperature to produce Compd. I.

The alkyl groups $R_2$ and $R_3$ are methyl, ethyl, propyl or butyl groups. Methyl and ethyl groups are particularly desirable.

The amount of the diester of oxalic acid employed is usually 1–10 moles, preferably 2–3 moles, per mole of the amino acid ester.

The reaction easily proceeds at a temperature of 40–120° C. A lower alkanol such as methanol and ethanol can be used as a solvent in the reaction. Since the dimethyl ester of oxalic acid is apt to crystallize, the use of a solvent is desirable when said ester is employed. The mixture obtained by neutralizing a hydrochloride of one of the amino acid esters with a base, such as triethyl amine, can be reacted with the diester of oxalic acid. The time required for the reaction is usually 1–5 hours.

The separation of Compd. I from the reaction mixture can be easily performed by fractional distillation after removing a solvent and salt formed, if necessary.

PREPARATION OF COMPD. II FROM COMPD. I

It was found that Compd. II can be produced in high yield by the reaction of Compd. I with phosgene in the presence of an organic base.

The phosgene is used as a dehydrating agent generally in an amount of 0.5–10 moles, particularly 1–2 moles, per mole of Compd. I.

As the organic base, a trialkylamine, such as trimethylamine, triethylamine and trioctylamine, and a heterocyclic amine, such as pyridine, can be used. Triethylamine provides particularly good results. These amines are generally used in an amount of 1–20 moles per mole of Compd. I. The use of the base in an amount of 1.8–2.2 moles per mole of phosgene employed is particularly desirable. Although the reaction proceeds without the organic base, the yield is low. The organic base makes the reaction time short and makes the yield high.

The reaction is carried out with or without use of a solvent by mixing Compd. I with phosgene and an organic base, with or without heating. As the solvent, a halogenated hydrocarbon, such as chloroform or an aromatic hydrocarbon, such as benzene and toluene, is used. The temperature can be freely selected from the 10° C. to the boiling point of the reaction mixture. The time required for the completion of the reaction is usually from 10 minutes to 5 hours.

Compd. II is separated from the reaction mixture by adding water to the reaction mixture. The organic layer is separated, the solvent, if used, is recovered and the residue is subjected to fractional distillation. From the aqueous layer, the organic base can be recovered and can be used repeatedly in the reaction.

PREPARATION OF COMPD. III FROM COMPD. II

The saponification of Compd. II provides Compd. III with high yield. The saponification reaction proceeds easily by contacting Compd. II with an aqueous solution of an alkali metal hydroxide, such as sodium and potassium hydroxide or of an alkaline earth metal hydroxide, such as calcium hydroxide. An alkali metal hydroxide is used most conveniently. The alkali metal hydroxide solution is usually 0.01–10 normal, particularly 0.1–5 normal. A water soluble organic solvent, such as methanol and ethanol, does not interfere with the saponification. Although the reaction proceeds at room temperature, heating may be resorted to. The reaction mixture may be employed in a next saponification without any treatment. When the reaction mixture is neutralized with an acid, Compd. III crystallizes from the mixture.

It was found that Compds. II and III can be easily converted to vitamin $B_6$ by the various processes illustrated by the following formulas.

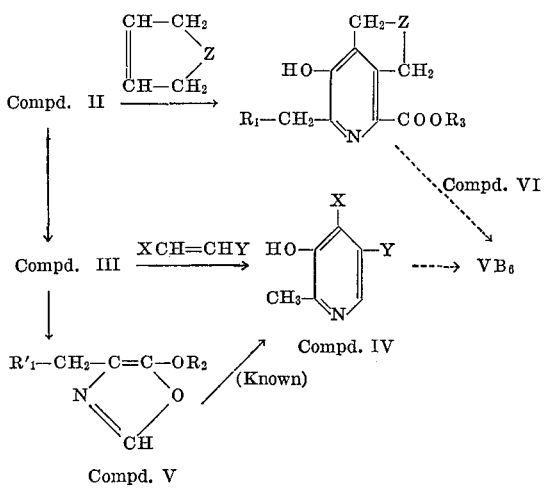

PREPARATION OF COMPD. IV FROM COMPD. III

Compd. III or an alkali metal salt thereof can be easily converted to Compd. IV, 2-methyl-3-hydroxy-4,5-substituted pyridine, which is a known precursor of vitamin $B_6$, by Diels-Alder reaction with a 1,2-disubstituted ethylene (dienophile).

In the reaction, the use of Compd. III is preferable to the use of the alkali metal salt of Compd. III.

As the dienophile XCH=CHY, a compound having the same or different substituent groups which can be easily converted to hydroxymethyl groups are particularly desirable. X or Y may be COOR, $CH_2OR$, CN, CHO, COG, $CH_2G$ and $CH_2NHR$ (wherein R means an alkyl alkenyl or an allyl group having one to 10 carbon atoms, and G is halogen, amino or hydroxy). Z in the compound

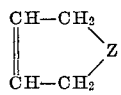

is O or O—R'—O (wherein R' is lower alkylene). The compound may be a di-lower-alkyl ester of maleic acid, maleic anhydride, fumaronitrile, γ-acetoxycrotonitrile, a di-lower-alkyl ester of fumaric acid, 2-butene-1,4-diol and its cyclic acetal with a lower alkyl aldehyde, 2,5-dihydrofuran, 1,4-diacetoxybutene(2) and γ-acetoxycrotonaldehyde. The amount of the dienophile is usually 1–10 moles per mole of Compd. III or its alkali metal salt.

The reaction is carried out in the presence or absence of a solvent with or without heating. Although an aromatic hydrocarbon, such as benzene and toluene, and a lower alkanol, such as methanol, ethanol and propanol, can be used as a solvent, good results are generally obtained when the reaction is carried out without solvent. The reaction temperature is selected from room temperature to 200° C. according to the species of dienophile employed, and the time required for the completion of the reaction is usually from 1 to 10 hours.

Compd. IV is separated from the reaction mixture as a mineral acid addition salt. For instance, the unreacted materials (and the solvent) are distilled off under reduced pressure and a lower alkanol containing hydrogen chloride is added to the residue. On further adding a non-solvent, such as ether, to the mixture, Compd. IV is crystallized out as the hydrochloride.

One or two carboxyl groups of Compd. III are usually converted to hydrogen by decarboxylation during the Diels-Alder reaction and the acid-treatment in the separation process, and the decarboxylation can be completed by heating the acid-treated mixture in the separation process.

The crude crystals of mineral acid addition salt of Compd. IV, can be recrystallized from ethanol and ethyl ether or from benzene.

PREPARATION OF COMPD. V FROM COMPD. III

Compd. III is readily decarboxylated by heating to Compd. V, 4-methyl-5-lower-alkoxy-oxazole, a known intermediate for the synthesis of Compd. IV [J. Org. Chem., 27, 2705 (1962)] or 4-lower-carboalkoxymethyl-5-lower-alkoxy-oxazole.

This decarboxylation is carried out with or without solvent, such as benzene, toluene and chloroform, at 50–200° C. The time required for the reaction is generally 1–10 hours.

Compd. V can be easily separated from the reaction mixture by vacuum distillation.

PREPARATION OF COMPD. VI FROM COMPD. II

Compd. II is converted to Compd. VI, 2-methyl-3-hydroxy-4,5-disubstituted-6-lower - carboalkoxy-pyridine, or 2-lower - carboalkoxymethyl - 3 - hydroxy-4,5-disubstituted-6-lower-carboalkoxy-pyridine, by Diels-Alder reaction with a compound having the formula

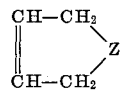

wherein Z is O or O—$R_4$—O in which $R_4$ is a lower alkylene group.

The compound may be a cyclic acetal of 2-butene-1,4-diol with a lower alkylaldehyde, such as 4,7-dihydro-1,3-dioxepine and 2-isopropyl-4,7-dihydro-1,3-dioxepine, and 2,5-dihydrofuran. These compounds are used in an amount of 1.0–10 moles per mole of Compd. II.

The reaction is usually carried out by heating the mixture of the reactants in the presence or absence of a solvent. Although an aromatic hydrocarbon such as benzene and toluene can be used as the solvent, better results are usually obtained in the absence of a solvent. The temperature is selected from the range between room temperature and 200° C. according to the nature of the compound employed. The time required for the reaction is 1–10 hours. It is desirable to remove the lower alkanol formed from the reaction system as the reaction proceeds.

Compd. VI can be easily converted to vitamin $B_6$ by saponification (hydrolysis) and decarboxylation.

PREPARATION OF COMPD. I

Example 1

A mixture of 9.4 g. (0.08 mole) ethyl ester of alanine and 35.1 g. (0.24 mole) diethyl ester of oxalic acid was heated to 100° C. for 4 hours. On fractional distillation of the reaction mixture, 15.8 g. ethyl ester of ethoxalyl-alanine was obtained as a fraction of B.P. 127° C./2 mm. Hg (yield 91%).

Example 2

X mole diethyl ester of oxalic acid was added to 117.1 g. (1 mole) ethyl ester of alanine and the mixture was heated to Y° C. for 5 hours to obtain the ethyl ester of ethoxalylalanine. The relationship between the reaction conditions and the yield is shown in Table 1.

TABLE 1

| Number: | Reaction conditions | | Yield, percent |
|---|---|---|---|
| | X, mole | Y, °C. | |
| 1 | 10 | 100 | 96.0 |
| 2 | 3 | 100 | 91.5 |
| 3 | 2 | 100 | 90.0 |
| 4 | 1 | 100 | 70.8 |
| 5 | 3 | 50 | 93.6 |

Example 3

69 g. methyl ester of alanine hydrochloride was dissolved in 100 ml. methanol, and 219 g. diethyl ester of oxalic acid and 51 g. triethylamine were further added. After the mixture was heated to 100° C. for 2 hours, the solvent was removed by distillation, and chloroform was added to the residue, then the triethylamine hydrochloride formed was removed by washing with water. On fractional distillation, 73 g. of a fraction of B.P. 140-150° C./5 mm. Hg was obtained. This fraction gave two peaks on gas chromatography and it was found to consist of methyl and ethyl esters of ethoxalylalanine in a mole ratio of 4:6.

Example 4

In 50 ml. methanol, 13.9 g. methyl ester of alanine hydrochloride and 35.4 g. dimethyl ester of oxalic acid were dissolved, and 10.1 g. triethylamine was further added to neutralize the solution. After the mixture was refluxed for 5 hours, the methanol was removed by distillation under reduced pressure, and the residue was washed with water. On fractional distillation of the residue, 13.6 g. methyl ester of methoxalylalanine of B.P. 143-145° C./5 mm. Hg and refractive index $n_D^{23.5}$ 1.4568 were recovered.

Example 5

A mixture of 37.8 g. (0.2 mole) diethyl ester of aspartic acid and 58.5 g. (0.4 mole) diethyl ester of oxalic acid was heated to 100° C. for 5 hours. The unreacted materials and products formed by side reaction were distilled off, and on fractional distillation diethyl ester of ethoxalylaspartic acid was obtained as a fraction of B.P. 162-164° C./0.03 mm. Hg. Amount 50.3 g.

*Elementary analysis.*—Calcd. (for $C_{12}H_{19}N_7O$) (percent): C, 49.82; H, 6.62; N, 4.84. Found (percent): C, 50.14; H, 6.58; N, 4.85.

Example 6

According to Example 5, the diethyl ester of aspartic acid (I) was reacted with the diethyl ester of oxalic acid (II) in the presence or absence of ethanol under the conditions listed in Table 2, and the diethyl ester of ethoxalylaspartic acid was obtained.

The reaction conditions and the results are summarized in Table 2.

TABLE 2

| Experiment No. | Starting compound | | Reaction conditions | | | Product amount, g. |
|---|---|---|---|---|---|---|
| | I, g. | II, g. | Ethanol, ml. | Time, hrs. | Temp., °C. | |
| 1 | 37.8 | 87.8 | 0 | 5 | 50 | 45.9 |
| 2 | 37.8 | 58.5 | 0 | 24 | 25 | 45.4 |
| 3 | 37.8 | 58.5 | 50 | 5 | (¹) | 49.1 |

¹ Reflux.

Example 7

To a solution consisting of 25.0 g. dimethyloxalate and 60 ml. methanol, 17.1 g. dimethylaspartate was added and the mixture was refluxed for 5 hours. After the reaction, the solvent and the unreacted starting compounds were distilled off. On fractional distillation of the residue, the dimethyl ester of methoxalylaspartic acid having B.P. of 153-156° C./0.02 mm. Hg was obtained. Amount 20.5 g.

On keeping the product at room temperature, it solidified. Melting point: 97-99° C.

*Elementary analysis.*—Calcd. (for $C_9H_{13}NO_7$) (percent): C, 43.73; H, 5.30; N, 5.67. Found (percent): C, 44.03; H, 5.34; N, 5.58.

The infrared spectrum of the product agreed with the structure of the desired compound.

PREPARATION OF COMPD. II

Example 8

To a solution prepared by dissolving 24 g. ethylester of ethoxalylalanine and 55 g. triethylamine in 100 ml. chloroform, a solution prepared by dissolving 15 g. phosgene in 100 ml. chloroform was added dropwise with stirring at room temperature. The mixed solution was then heated to 50° C. for 1 hour to complete the reaction. Water was added to the reaction mixture to dissolve the triethylamine, and the chloroform layer was separated. After distilling off of the chloroform from the layer, the residue was fractionally distilled under reduced pressure to obtain the ethyl ester of 4-methyl-5-ethoxy-2-oxazolecarboxylic acid as a fraction of B.P. 128° C./4 mm. Hg in an amount of 14.6 g. (yield 70.0%).

*Elementary analysis.*—Calcd. (for $C_9H_{13}NO_4$) (percent): C, 54.26; H, 6.58; N, 7.03. Found (percent): C, 53.69; H, 6.84; N, 7.26.

Example 9

To a solution prepared by dissolving 37.8 g. methyl ester of methoxalylalanine and 101 g. triethylamine in 160 ml. chloroform, a solution prepared by dissolving 29.7 g. phosgene in 130 ml. chloroform was added dropwise with stirring at room temperature during 1 hour. The reaction mixture was then washed with water, the chloroform layer was dried with anhydrous magnesium sulfate, and the chloroform was distilled off. The residue was fractionally distilled under reduced pressure to obtain the methyl ester of 4-methyl-5-methoxy-2-oxazolecarboxylic acid having a B.P. of 113-120° C./5 mm. Hg, which crystallized in a short time. Melting point 75-76° C. Obtained amount 25.8 g. (yield 75.5%).

*Elementary analysis.*—Calcd. (for $C_7H_9O_4N$) (percent): C, 49.12; H, 5.30; N, 8.18. Found (percent): C, 49.37; H, 5.20; N, 8.13.

Example 10

In 240 ml. chloroform, 60.9 g. methyl ester of ethoxalylalanine and 151 ml. triethylamine were dissolved. To the solution, 178 g. chloroform solution containing 44.6 g. phosgene was added dropwise with stirring at 25° C., then the mixture was kept at 50° C. for 1 hour with stirring. The reaction mixture was washed with water and was dried. On fractional distillation under reduced pressure, the ethyl ester of 4-methyl-5-methoxy-2-oxazolecarboxylic acid was obtained as a fraction of B.P. 116-118° C./4 mm. Hg in an amount of 39.3 g. (yield 71.0%). This fraction crystallized in a short time.

Calculated (for $C_8H_{11}O_4N$) (percent): 7.56. Nitrogen found (percent): 7.88.

Example 11

According to Example 9, the butyl ester of methoxalylalanine was reacted with phosgene in the presence of triethylamine. As a fraction of B.P. 134-137° C./3 mm. Hg, the methyl ester of 4-methyl-5-butoxy-2-oxazolecarboxylic acid was obtained in 63.7% yield.

Calculated (for $C_{10}H_{15}O_4N$) (percent): 6.57. Nitrogen found (percent): 7.10.

Example 12

To a solution prepared by dissolving 5.67 g. (0.03 mole) methyl ester of methoxalylalanine and 0.15 mole base in 30 ml. chloroform, a mixture of 0.045 mole phosgene and 20 ml. chloroform was added. The reaction was carried out under various conditions listed in Table 3. After the reaction, the reaction mixture was quantitatively analyzed for the desired oxazole derivative by gas chromatography and the yield was calculated and is listed in Table 3.

TABLE 3

| Exp. No. | Base | Reaction temp., °C. | Reaction time, min. | Yield, percent |
|---|---|---|---|---|
| 1 | Triethylamine | (1) | 10 | 80.1 |
| 2 | do | 50 | 60 | 65.5 |
| 3 | do | (1) | 10 | 72 |

1 Room temperature.
NOTE.—In Experiment No. 3, a solution prepared by dissolving the tarting compound and trimethylamine in 50 ml. chloroform was used.

Example 13

In 100 ml. chloroform, 43.44 g. (0.2 mole) ethyl ester of ethoxalylalanine and 60.6 g. (0.6 mole) triethylamine were dissolved, and 217.1 g. chloroform solution containing 29.7 g. (0.3 mole) phosgene was further added at 15–20° C. dropwise over one hour. After the addition, the mixture was stirred for 10 minutes and was washed with 100 ml. water three times, whereupon chloroform was removed by distillation under reduced pressure. On fractional distillation of the residue, 33.0 g. of a fraction of B.P. 136–153° C./10 mm. Hg and 3.4 g. of a fraction of B.P. 153° C./10 mm. Hg–149° C./3 mm. Hg were obtained. On quantitative analysis by gas chromatography, it was found that 30.6 g. and 1.4 g. of the ethyl ester of 4-methyl-5-ethoxy-2-oxazolecarboxylic acid was contained in the two fractions respectively (yield 80.4%).

Example 14

Example 13 was repeated, but phosgene gas was blown into the mixture of the starting compound and triethylamine. The ethyl ester of 4-methyl-5-ethoxy-2-oxazolecarboxylic acid obtained weighed 22.7 g. (yield 56.9%).

Example 15

To 6.52 g. (0.03 mole) ethyl ester of ethoxalylalanine, 30 ml. chloroform and 0.075 mole tributylamine (14.8 g.) or trioctylamine (26.6 g.) were added, and 30 g. chloroform solution containing 5.94 g. (0.03 mole) phosgene was further added at 15–20° C. over a period of 20 minutes. After the addition, the mixture was stirred for 10 minutes and was washed with 30 ml. water. The organic layer was diluted to 100 ml. and quantitatively analyzed by gas chromatography.

When tributylamine was used, the yield of ethylester of 4-methyl-5-ethoxy-2-oxazolecarboxylic acid was 31.1% and 52.6% of the amount of the starting compound employed was recovered. Therefore, the yield of the product based on the reacted starting compound was 65.6%.

When trioctylamine was used, the yield of the product was 11.7% and 56.5% of the starting compound was recovered, therefore the yield of the product based on the reacted starting compound was 27%.

Example 16

28.9 g. (0.1 mole) diethylester of ethoxalylaspartic acid was added to 100 ml. chloroform, then 40.4 g. (0.4 mole) triethylamine was further added, and the mixture was stirred in a three-neck flask at 15° C. To the solution, 100 g. chloroform solution containing 19.8 g. (0.2 mole) phosgene was added dropwise over 80 minutes, and the mixture was stirred for further 10 minutes. The organic layer was then separated and washed with 100 ml. water. After drying of the layer with anhydrous magnesium sulfate, the chloroform was distilled off and the residue was fractionally distilled to obtain the ethyl ester of 4-carbethoxymethyl-5-ethoxy-2 - oxazolecarboxylic acid as a yellow liquid fraction having a B.P. of 166–167° C./0.2 mm. Hg in an amount of 20.95 g. Yield 77.2%. Refractive index $n_D^{24}$ 1.4792.

Elementary analysis.—Calcd. (for $C_{12}H_{17}O_6N$) (percent): C, 53.13; H, 6.32; N, 5.16. Found (percent): C, 53.23; H, 6.46; N, 5.14.

Example 17

The process of Example 16 was repeated, but triethylamine and phosgene were respectively used in amounts of 20.2 g. (0.2 mole) and 9.9 g. (0.1 mole). The amount of the recovered product was 23.8 g. Yield 87.8%. (The infrared absorption spectra of the product were identical with those of the product obtained in Example 15.)

Example 18

In 100 ml. chloroform, 12.36 g. (0.05 mole) dimethylester of methoxalylaspartic acid was dissolved and 20.2 g. (0.2 mole) triethylamine was added to the solution. The mixture was put into a three-neck flask, and 50 g. chloroform solution containing 9.9 g. (0.1 mole) phosgene was added dropwise at 15° C. requiring 1 hour. After completion of the addition, the reaction mixture was further stirred for 10 minutes. The reaction mixture was then washed with 80 ml. water four times, and was dried with anhydrous magnesium sulfate. After the chloroform was distilled off from the reaction mixture, the residue was fractionally distilled to obtain the methyl ester of 4 - carbomethoxymethyl-5-methoxy-2-oxazole carboxylic acid as a yellow liquid having a B.P. of 156–157° C./0.5 mm. Hg and weighing 5.8 g. Yield 50.6%. Refractive index $n_D^{23}$ 1.4959.

One standing at room temperature, the compound crystallized. Melting point: 56–59° C.

Elementary analysis.—Calcd. (for $C_9H_{11}O_6N$) (percent): C, 47.16; H, 4.84; N, 6.11. Found (percent): C, 47.28; H, 4.67; N, 6.12.

PREPARATION OF COMPD. III

Example 19

To 115 ml. of 0.87 N solution of sodium hydroxide in aqueous ethanol, 19.9 g. of ethyl ester of 4-methyl-5-ethoxy-2-oxazolecarboxylic acid was added and the mixture was refluxed for 1 hour. After the ethanol was distilled off from the reaction mixture, the residue was neutralized with hydrochloric acid to crystallize 4-methyl-5-ethoxy-2-oxazolecarboxylic acid which was then recovered by filtration and weighed 13.6 g. (yield 79.6%). Melting point: 81–83° C.

Elementary analysis.—Calcd. (for $C_7H_9NO_4$) (percent): C, 49.12; H, 5.30; N, 8.18. Found (percent): C, 49.50; H, 5.23; N, 8.24.

Example 20

To 9.9 g. (0.05 mole) ethyl ester of 4-methyl-5-ethoxy-2-oxazolecarboxylic acid, 11.4 ml. of 5 normal aqueous sodium hydroxide solution (0.057 mole) was added over 10 minutes while cooling with ice water. After 20 minutes 9.56 ml. of 5.95 N hydrochloric acid (0.057 mole) was added to the mixture. The crystals formed were recovered by filtration and were dried over phosphorus pentoxide at 30° C. under reduced pressure. They weighted 7.7 g. (Yield 90%). Melting point 83–84° C. The infrared absorption spectra of the crystals were identical with those of crystals obtained in Example 19.

4-methyl-5-methoxy-2-oxazolecarboxylic acid and 4-methyl - 5 - butoxy - 2-oxazolecarboxylic acid were also obtained in high yield according to the manner described above. The melting point of the former was 91–92° C. and that of the latter was 47–49° C.

Example 21

To 13.56 g. (0.05 mole) ethyl ester of 4-carbethoxymethyl-5-ethoxy-2-oxazole carboxylic acid, 23 ml. of 4.86 normal aqueous solution of sodium hydroxide (0.11 mole) was added and the mixture was stirred for 4 hours at room temperature, until it became homogeneous. The mixture was then neutralized with 23 ml. of 4.86 normal hydrochloric acid (0.11 mole) and was cooled. The formed crystals of 4-carboxymethyl-5-ethoxy-2-oxazole carboxylic acid were recovered by filtration and were dried at 30–35° C. under reduced pressure over phosphorus pentoxide. Amount 5.6 g. Yield 52%. Melting point 112° C. (decomposed).

Elementary analysis.—Calcd. (for $C_8H_9O_6N$) (percent): C, 44.66; H, 4.22; N, 6.51. Found (percent): C, 44.62; H, 4.06; N, 6.36.

PREPARATION OF COMPD. IV

Example 22

A mixture of 1.7 g. 4-methyl-5-ethoxy-2-oxazolecarboxylic acid and 5.2 g. diethyl maleate was kept at 100° C. for 6 hours. On adding ethanol containing hydrogen chloride and further adding ether to the reaction mixture, crystals of 2-methyl-3-hydroxy-4,5-dicarbethoxypyridine hydrochloride were formed. Amount 2.5 g. (yield 86.2%). Melting point: 144–145° C.

Elementary analysis.—Calcd. (for $C_{12}H_{15}NO_5 \cdot HCl$) (percent): C, 49.74; H, 5.57; N, 4.84. Found (percent): C, 49.63; H, 5.34; N, 4.88.

Example 23

The reaction of Example 22 was repeated at exception that the reaction conditions were replaced by 140° C. for 4 hours. The amount of 2-methyl-3-hydroxy-4,5-dicarbethoxypyridine hydrochloride was 2.0 g. (yield 69%).

Example 24

A mixture of 1.7 g. 4-methyl-5-ethoxy-oxazolecarboxylic acid, 14 g. 2,5-dihydrofuran and 0.1 g. trichloroacetic acid was kept at 180° C. for 2 hours in an autoclave. The reaction mixture was taken out with ethanol and was evaporated to dryness under reduced pressure. The residue was dissolved in ethanol containing hydrogen chloride and treated with active carbon. The crystals formed by addition of ether were recovered by filtration. Amount 1.3 g. Melting point: 238–239° C.

Elementary analysis.—Calcd. (for $C_8H_9NO_2 \cdot HCl$) (percent): C, 51.21; H, 5.37; N, 7.47. Found (percent): C, 51.05; H, 5.37; N, 7.43.

From the results of the elementary analysis and infrared absorption spectra, the crystals were identified as 2-methyl-3-hydroxy-4,5-epoxymethyl pyridine hydrochloride.

Example 25

A mixture of 1.7 g. 4-methyl-5-ethoxy-2-oxazolecarboxylic acid, 0.78 g. fumaronitrile and 20 ml. methanol was refluxed for 5 hours. After the reaction, the reaction mixture was cooled and 4 ml. concentrated hydrochloric acid was added. The solvent was then distilled off and the residue was dried with benzene. When recrystallized from a mixed solvent of methanol and benzene it formed yellow crystals. Amount 0.9 g. Melting point: 187–188° C.

Elementary analysis.—Calcd. (for $C_8H_5N_3O$) (percent): C, 60.37; H, 3.17; N, 26.41. Found (percent): C, 60.54; H, 3.08; N, 26.49.

From the results of the elementary analysis and infrared absorption spectra, the crystals were identified as 2-methyl-3-hydroxy-4,5-dicyanopyridine.

Example 26

To 28.7 ml. 0.87 normal ethanolic solution of sodium hydroxide, 5.0 g. ethyl ester of 4-methyl-5-ethoxy-2-oxazolecarboxylic acid was dissolved, and the solution was refluxed for 30 minutes to hydrolyze the compound to the sodium salt of 4-methyl-5-ethoxy-2-oxazolecarboxylic acid. After the hydrolyzation mixture was cooled, 12.9 g. ethyl maleate was added, and the mixture was concentrated under reduced pressure while cooling. The concentrated mixture was then kept at 120° C. for 4 hours, dissolved in water, and extracted with ether. When hydrogen chloride gas was introduced into the dried ether extract, crystals were formed. Amount 0.4 g.

From the results of elementary analysis and infrared absorption spectra, the crystals were identified as 2-methyl-3-hydroxy-4,5-dicarbethoxypyridine hydrochloride.

Example 27

A mixture of 1.57 g. 4-methyl-5-methoxy-2-oxazoleboxylic acid and 5.2 g. ethyl maleate was kept at 100° C. for 5 hours. To the reaction mixture, ethanol containing hydrogen chloride and ethyl ether were added, and the mixture was left to stand. The crystals formed were separated by filtration. Amount 2.4 g.

The crystals were identified as 2-methyl-3-hydroxy-4,5-dicarbethoxypyridine hydrochloride.

Example 28

A mixture of 2.0 g. 4-methyl-5-butoxy-2-oxazolecarboxylic acid and 5.2 g. ethyl maleate was kept at 120° C. for 4 hours. After addition of ethanol containing hydrogen chloride and ethyl ether, the mixture was left to stand. The crystals formed were recovered by filtration. Amount 2.0 g. The crystals were identified as 2-methyl-3-hydroxy-4,5-dicarbethoxypyridine hydrochloride.

Example 29

A mixture of 20.3 g. 4,7-dihydro-1,3-dioxepine and 1.7 g. 5-ethoxy-4-methyl-2-oxazolecarboxylic acid was kept at 190° C. for 3 hours. After the unreacted compounds were distilled off, 120 ml. 2 normal hydrochloric acid was added to the residual reaction mixture, and the mixture was refluxed for 2 hours. After distilling off the solvent, 1.0 g. crystals was obtained when ethanol and acetone were added to the residue. Melting point: 202–204° C. From the results of infrared spectra and elementary analysis, the crystals were identified as pyridoxine hydrochloride.

Elementary analysis.—Calcd. (for $C_8H_{11}NO_3 \cdot HCl$) (percent): C, 46.72; H, 5.88; N, 6.81. Found (percent): C, 46.89; H, 6.15; N, 6.76.

Example 30

A mixture of 1.7 g. 4-methyl-5-ethoxy-2-oxazolecarboxylic acid and 28.4 g. 2-isopropyl-4,7-dihydro-1,3-dioxepine was refluxed for 6 hours. The unreacted compounds were recovered by concentrating the reaction mixture under reduced pressure. To the residue, 40 ml. 0.5 normal hydrochloric acid was added and the mixture was refluxed for 1.5 hours, treated with active carbon, and concentrated. When acetone was added to the concentrated mixture, 1.0 g. of pyridoxine hydrochloride was obtained. Melting point: 202–205° C.

PREPARATION OF COMPD. V

Example 31

Crystals of 17 g. 4-methyl-5-ethoxy-2-oxazolecarboxylic acid were heated at 100° C. for 1 hour. Gas formation was observed and the crystals melted. The material was distilled under reduced pressure to obtain 4-methyl-5-ethoxyoxazole of B.P. 78–80° C./50 mm. Hg in an amount of 10.3 g. (yield 81%).

Example 32

15.7 g. of 4-methyl-5-methoxy-2-oxazolecarboxylic acid was treated as described in Example 31, and 9.1 g. 4-methyl-5-methoxyoxazole was obtained (yield 80%).

Example 33

19.9 g. of 4-methyl-5-butoxy-2-oxazolecarboxylic acid was heated to 80° C. for 10 hours in 50 ml. benzene. After the benzene was removed by distillation, the residue was distilled under reduced pressure to obtain 12.7 g. 4-methyl-5-butoxyoxazole (yield 82%).

PREPARATION OF COMPD. VI

Example 34

A mixture of 20 g. (0.1 mole) ethyl ester of 5-ethoxy-4-methyl-2-oxazolecarboxylic acid and 42.6 g. (0.3 mole) 2-isopropyl-4,7-dihydro-1,3-dioxepine was heated under reflux for 7 hours on an oil bath at 180–185° C. The reaction mixture was fractionally distilled under reduced pressure to recover 29.4 g. (recovery yield 69%) of the dioxepine derivative as a fraction of B.P. 65–72° C./17 mm. Hg and to recover 6.8 g. (recovery yield 34%) of the oxazole derivative as a fraction of B.P. 100–120° C./3 mm. Hg. To the residue 150 ml. 1 normal hydrochloric acid was added and the mixture heated for 2 hours on a boiling water batch. After undissolved materials were filtered off, the filtrate was concentrated and was mixed with ethanol to crystallize 4-methyl-5-hydroxy-6-hydroxymethyl-2-oxodihydrofuro[3,4-b] pyridine (hereinafter this compound is referred to as pyridine-lactone) hydrochloride in an amount of 10.2 g. The yield based on the reacted oxazole derivative was 66.2%. Melting point 186–186.5° C.

The crystals were left to stand under reduced pressure in a desiccator which contained solid sodium hydroxide, whereby hydrogen chloride was removed from the crystals to give pyridine-lactone. The pyridine-lactone was recrystallized from water.

(1) Melting point: 188–190° C.
(2) Ultra-violet absorption spectra (mμ):

$$\lambda_{max}^{0.1\ N-HCl}\ 297.5$$

$$\lambda_{max}^{0.1\ N-NaOH}\ 272,\ 303.5$$

(3) *Elementary analysis.*—Calcd. (for $C_9H_9ON$) (percent): C, 55.38; H, 4.65; N, 7.18. Found (percent): C, 55.40; H, 4.78; N, 7.04.

The crystals of 0.59 g. (0.003 mole) pyridine-lactone were dissolved in 15 ml. 1.0 normal aqueous solution of sodium hydroxide and the mixture was kept for 3 hours on a boiling water bath, when 15 ml. 1 normal hydrochloric acid were gradually added to the mixture, 3-carboxy-5-methyl-6-hydroxy-dihydrofuro [3,4-c] pyridine (hereinafter referred to as carboxypyridine furan) was crystallized in an amount of 0.53 g.

(1) Solubility: Sparingly soluble in water and ethanol.
(2) Melting point: Indistinct (discolored at about 270° C.)
(3) Ultra-violet absorption spectra (mμ):

$$\lambda_{max}^{0.1\ N-HCl}\ 273.5,\ 299.5$$

$$\lambda_{max}^{0.1\ N-NaOH}\ 295$$

The crystals were dissolved in 25 ml. ethanol saturated with hydrogen chloride and refluxed for 3 hours. After the reaction mixture was concentrated, 25 ml. ethanol saturated with hydrogen chloride was added and heated to cause esterification. The esterification mixture was concentrated to obtain 3-carbethoxy-5-methyl-6-hydroxy-dihydrofuro [3,4-c] pyridine (hereinafter referred to as carbethoxypyridine-furan) hydrochloride. The hydrochloride was dissolved in water and the solution was adjusted to pH 7 with an aqueous solution of sodium bicarbonate to crystallize carbethoxypyridine-furan in an amount of 0.45 g. The yield based on pyridine-lactone was 67.2%. The crystals were recrystallized from hot ethanol and purified needle-shaped crystals were obtained.

(1) Melting point: 234–236° C. (decomp.).
(2) *Elementary analysis.*—Calcd. (for $C_{11}H_{13}O_4N$) (percent): C, 59.18; H, 5.87; N, 6.28. Found (percent): C, 59.14; H, 5.92; N, 6.30.

In 10 ml. of 1 normal aqueous solution of sodium hydroxide, 0.45 g. (0.002 mole) carbethoxypyridine-furan was dissolved and refluxed for 4 hours on a boiling water bath. When 10 ml. of 1 normal hydrochloric acid were added to the reaction mixture, 0.35 g. carboxypyridine-furan was obtained. The yield based on carboxypyridine-furan was 90%.

Example 35

A mixture of 22.2 g. (purity 90%: 0.1 mole) ethyl ester of 5-ethoxy-4-methyl-2-oxazolecarboxylic acid and 42.6 g. (0.3 mole) 2-isopropyl-4,7-dihydro-1,3-dioxepine was refluxed for 6 hours on an oil bath at 180° C. As the reduction proceeded, the ethanol formed was removed while the reaction temperature was kept at 170–175° C. After the reaction was completed, 26.2 g. unreacted dioxepine derivative was recovered from the reaction mixture. When 70 ml. ethanol saturated with hydrogen chloride to the residue, 5-carbethoxy-7-methyl-8-hydroxypyrido [3,4-e]-2-isopropyl-dihydro [1,3] dioxepine hydrochloride was crystallized out. The crystals were recovered by filtration and washed with ethanol. Amount 7.0 g. Melting point: 162–164° C. (decomp.).

Example 36

A mixture of 10 g. (0.05 mole) ethyl ester of 5-ethoxy-4-methyl-2-oxazolecarboxylic acid and 10.5 g. (0.15 mole) 2,5-dihydrofuran was kept at 180–190° C. for 8 hours in an autoclave. To the reaction mixture of 100 ml. ethanol was added, and the resulting mixture was concentrated to obtain 4.3 g. crystals of carbethoxypyridine-furan. The crystals were dissolved in hot ethanol and the solution was treated with active carbon, then cooled to obtain needle-shaped purified crystals.

(1) Melting point: 234–236° C. (decomp.).
(2) Melting point of hydrochloride: 197° C. (decomp.).
(3) Mixed melting point with carbethoxypyridine-furan obtained in Example 34: 235–236° C. (decomp.).
(4) Ultra-violet absorption spectra (mμ):

$$\lambda_{max}^{0.1\ N-HCl}\ 295$$

$$\lambda_{max}^{0.1\ N-NaOH}\ 305.5$$

(5) *Elementary analysis.*—Calcd. (for $C_{11}H_{13}O_4N$) (percent): C, 59.18; H, 5.87; N, 6.28. Found (percent): C, 59.17; H, 6.07; N, 6.14.

Example 37

A mixture of 1.7 g. (0.01 mole) methyl ester of 5-methoxy-4-methyl-2-oxazolecarboxylic acid and 3.5 g. (0.05 mole) 2,5-dihydrofuran was kept at 170° C. for 6 hours in an autoclave. To the reaction mixture, methanol was added, and concentrated to obtain 0.6 g. crystals of 3-carbomethoxy-5-methyl-6-hydroxydihydrofuro [3,4-c] pyridine. The crystals were purified by dissolving them in hot ethanol and treating the solution with active carbon.

(1) Melting point 230–232° C. (decomp.).
(2) Ultra-violet absorption spectra (mμ):

$$\lambda_{max}^{0.1\ N-HCl}\ 295$$

$$\lambda_{max}^{0.1\ N-NaOH}\ 309$$

(3) *Elementary analysis.*—Calcd. (for $C_{10}H_{11}NO_4$) (percent): C, 57.41; H, 5.30; N, 6.70. Found (percent): C, 57.48; H, 5.41; N, 6.54.

What we claim is:
1. A compound of the formula

$$R_1-CH_2-C{=\!=\!=}C-OR_2$$
$$\underset{\underset{COOR_3}{|}}{\overset{N\diagdown\ \ \diagup O}{\underset{C}{\|}}}$$

wherein $R_1$ is hydrogen, carboxyl, or carbo-lower alkoxy, $R_2$ is lower alkyl, and $R_3$ is hydrogen or lower alkyl.

2. A compound as set forth in claim 1, wherein $R_1$ is hydrogen.

3. A compound as set forth in claim 1, wherein $R_3$ is hydrogen.

4. A compound as set forth in claim 1, wherein $R_1$ is carbo-lower alkoxy.

References Cited

UNITED STATES PATENTS

| | | | |
|---|---|---|---|
| 3,282,952 | 11/1966 | Schaeren | 260—307 |
| 3,285,924 | 11/1966 | Osbond | 260—297.5 |
| 3,413,297 | 11/1968 | Miki et al. | 260—297 |

OTHER REFERENCES

Roberts et al., Basic Principles in Organic Chemistry, Benjamin, p. 665, 1965.

Raphael et al., Advances in Organic Chemistry, vol. 5, Interscience, pp. 6 and 39, 1965.

ALAN L. ROTMAN, Primary Examiner

U.S. Cl. X.R.

260—294.9, 295, 297, 999